(12) United States Patent
Coron et al.

(10) Patent No.: US 7,146,006 B1
(45) Date of Patent: Dec. 5, 2006

(54) METHOD FOR IMPROVING A RANDOM NUMBER GENERATOR TO MAKE IT MORE RESISTANT AGAINST ATTACKS BY CURRENT MEASURING

(75) Inventors: Jean-Sebastien Coron, Paris (FR); David Naccache, Paris (FR)

(73) Assignee: Gemplus, Gemenos Cedex (FR)

( * ) Notice: Subject to any disclaimer, the term of this patent is extended or adjusted under 35 U.S.C. 154(b) by 804 days.

(21) Appl. No.: 10/031,065

(22) PCT Filed: Jul. 12, 2000

(86) PCT No.: PCT/FR00/02009

§ 371 (c)(1),
(2), (4) Date: Apr. 2, 2002

(87) PCT Pub. No.: WO01/06350

PCT Pub. Date: Jan. 25, 2001

(30) Foreign Application Priority Data

Jul. 15, 1999 (FR) .................................. 99 09316

(51) Int. Cl.
*H04K 1/00* (2006.01)
*H04L 9/28* (2006.01)
*G06F 11/30* (2006.01)

(52) U.S. Cl. ........................... 380/29; 380/28; 713/194
(58) Field of Classification Search ................ 726/20; 380/49, 28, 29; 713/194
See application file for complete search history.

(56) References Cited

U.S. PATENT DOCUMENTS

| | | | |
|---|---|---|---|
| 5,793,871 A * | 8/1998 | Jackson | 380/54 |
| 6,028,939 A * | 2/2000 | Yin | 713/189 |
| 6,044,388 A * | 3/2000 | DeBellis et al. | 708/254 |
| 6,278,783 B1 * | 8/2001 | Kocher et al. | 380/277 |
| 6,327,661 B1 * | 12/2001 | Kocher et al. | 713/193 |
| 2004/0040026 A1 * | 2/2004 | Farrugia | 719/310 |

FOREIGN PATENT DOCUMENTS

WO   WO97/20266   6/1997

OTHER PUBLICATIONS

"DEA-Based Pseudorandom Number Generator", IBM Technical Disclosure Bulletin, U.S., IBM Corp., New York, vol. 35, No. 1B, Jun. 1, 1992, pp. 431-434.
"Initialization Procedure for DEA-Based Pseudorandom Number Generator", IBM Technical Bulletin, U.S., IBM Corp., New York, vol. 35, No. 1B, Jun. 1, 1992, pp. 351-353.
"The PGP Attack FAQ, Part 4", Jan. 25, 1997, 2 pps.

\* cited by examiner

*Primary Examiner*—Gilberto Barrón, Jr.
*Assistant Examiner*—William S. Powers
(74) *Attorney, Agent, or Firm*—Buchanan Ingersoll & Rooney PC

(57) ABSTRACT

Two methods for random number generation are modified to make them more resistant to attacks by current measurements. The methods are particularly designed to be implemented in electronic devices such as smart cards, PCMCIA, badges, contactless cards or any other portable device. The DES algorithm is encrypted using a key K having a value D representing date information, to generate an integer variable I. For j ranging from 1 to m, the following steps are carried out: substituting s with s XOR I; introducing in the integer variable y the result of the encryption of s with the DES algorithm using the key K; introducing in $x_j$ the result of y or s; substituting s with y XOR I; and introducing in s the result of the encryption of s with the DES algorithm using the key K. The sequence $(x_1, x_2, x_m)$ is then restored in the output.

14 Claims, 2 Drawing Sheets

METHOD FOR IMPROVING A RANDOM NUMBER GENERATOR TO MAKE IT MORE RESISTANT AGAINST ATTACKS BY CURRENT MEASURING

This disclosure is based upon French Application No. 99/09316, filed on Jul. 15, 1999 and International Application No. PCT/FR00/02009, filed Jul. 12, 2000, which was published on Jan. 25, 2001 in a language other than English, the contents of which are incorporated herein by reference.

BACKGROUND OF THE INVENTION

The present invention relates to an improvement in a method for generating random numbers or random sources, in particular sources developed in cryptographic systems such as random number generators on board smart cards.

In particular, it is intended to be implemented in testing and validating electronic devices of the following types: smart cards; Personal Computer Memory Card International Association (PCMCIA) cards; badges; contactless cards, or any other handheld, wearable, or portable device.

Most public-key cryptographic systems (also known as "asymmetric cryptography" systems) and most secret-key cryptographic systems (also known as "symmetric cryptography" systems) require secret random numbers to be drawn. It is essential for such random numbers (which subsequently serve as keys) to be unpredictable a priori, and not to have any regular patterns enabling them to be found by exhaustive or improved exhaustive search strategies in which the most probable keys are looked for first.

It is possible to construct a random source on the basis of a function whose inverse is difficult to compute. Let f be such a function. It is possible to construct a random source by starting by selecting a random initialization variable s, and by applying the function f to the succession of values s, s+1, s+2, . . . The output of the random source is defined as f(s),f(s+1),f(s+2), . . . . As a function of the properties of the function f used, it can be preferable to keep only a few bits of the output f(s),f(s+1),f(s+2). . .

A method for generating random numbers on the basis of a function whose inverse is difficult to compute is specified in ANSI Standard X9.17. That method uses the Data Encryption Standard (DES) algorithm with a secret key K that must be used only in that algorithm. The method for generating random numbers takes as input a random and secret integer s of size 64 bits, and an integer m, and sends back as output m 64-bit random integers $x_1, x_2, \ldots, x_m$. That method is characterized by the following three steps:

1) With the DES algorithm and using the key K, encrypt a value D representing date data and put the result in the integer variable I.
2) For j in the range 1 to m, execute the following steps:
2) a) Replace s by s XOR I. 2) b) Put in $x_j$ the result of the encryption of s with the DES algorithm using the key K.
2) c) Replace s with $x_j$ XOR I.
2) d) Put in s the result of the encryption of s with the DES algorithm using the secret key K.
3) Return as output the succession $(x_1, x_2, \ldots, x_m)$.

It is possible to use this random number generator in an application for which the random number generator is already available, but is deemed to be of insufficient quality, e.g. a random number generator on board the microprocessor of a smart card. In which case, the above-described method is used to improve the quality of the random number generator. That method takes as input a random and secret integer s of size 64 bits and an integer m, and it sends back as output m 64-bit random integers $x_1, x_2, \ldots, x_m$. The method uses the Data Encryption Standard (DES) with a secret key K which must be used only in that algorithm. The method uses a source S of quality deemed to be insufficient of random integers on 64 bits. The method is characterized by the following three steps:

1) For j in the range 1 to m
1) a) Generate an integer I by means of the source S.
1) b) Replace s by s XOR I.
1) c) Put in $x_j$ the result of the encryption of s with the DES algorithm using the key K.
1) d) Generating an integer I by means of the source S.
1) e) Replace s with $x_j$ XOR I.
1) f) Put in s the result of the encryption s with the DES algorithm using the key K.
2) Return as output the succession $(x_1, x_2, \ldots, x_m)$.

It has appeared that implementing a secret-key encryption algorithm (e.g. the DES algorithm) on a smart card is vulnerable to attacks consisting of differential analysis of current consumption or "Differential Power Analysis" (DPA) making it possible to discover the secret key. The principle of such DPA attacks is based on the fact that the power consumption of (i.e. the current consumed by) the microprocessor executing instructions varies depending on the item of data that is being manipulated. To discover the secret key, it is necessary for the input message or the output message of the encryption algorithm to be known.

The two above-described methods of generating random numbers are thus vulnerable to attacks of the DPA type. The random numbers sent back as output by those two methods are output messages from the encryption algorithm. On the basis of the power consumption of the smart card, it is thus possible to discover the encryption key K, and thus then to predict the output of the random number generator.

DESCRIPTION OF THE INVENTION

Figure 1:
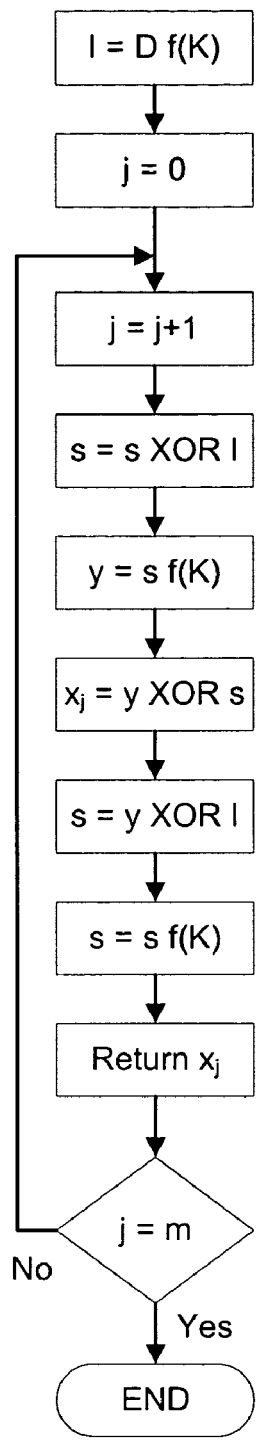
FIG. 1 is a flow chart of a first modified method of generating random numbers to make them capable of withstanding DPA-type attacks.
Figure 2:
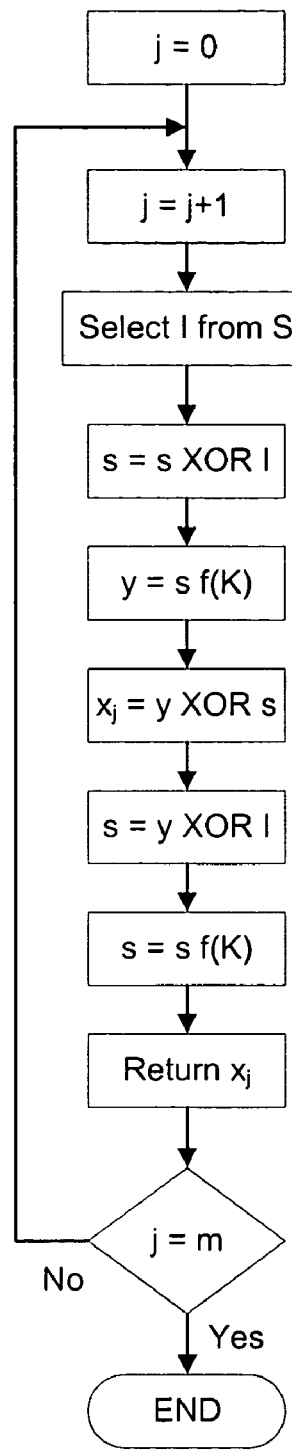
FIG. 2 is a flow chart of a second modified method of generating random numbers to make them capable of withstanding DPA-type attacks.

The method for the invention consists of a modification in the above-described methods of generating random numbers so as to make them capable of withstanding DPA-type attacks.

The first modified method for generating random numbers uses the Data Encryption Standard (DES) algorithm with a secret key K that must be used only in that algorithm. It takes as input a random and secret integer s of size 64 bits, and an integer m, and sends back as output m 64-bit random integers $x_1, x_2, \ldots, x_m$. The method uses an intermediate integer variable y. The method is characterized by the following three steps:

1) With the DES algorithm and using the key K, encrypt a value D representing date data and put the result in an integer variable I.
2) For j in the range 1 to m, execute the following steps:
2) a) Replace s by s XOR I.

2) b) Put in the integer variable y the result of the encryption of s with the DES algorithm using the key K.

2) c) Put in $x_j$ the result of y XOR s.

2) d) Replace s with y XOR I.

2) e) Put in s the result of the encryption of s with the DES algorithm using the secret key K.

3) Return as output the succession $(x_1, x_2, \ldots, x_m)$

In this improved method for generating random numbers, DPA-type current-measuring attack is impossible because the input and output messages of the DES encryption algorithm are not known.

The second improved method for generating random numbers is used to increase the quality of a random number generator whose quality is deemed to be insufficient. This method takes as input a random and secret integer s of size 64 bits and an integer m, and sends back as output m 64-bit random integers $x_1, x_2, \ldots, x_m$. The method uses the Data Encryption Standard (DES) with a secret key K which must be used only in that algorithm. The method uses a source S of quality deemed to be insufficient of random integers on 64 bits. The method is characterized by the following two steps:

1) For j in the range 1 to m:

1) a) Generate an integer I by means of the source S.

1) b) Replace s with s XOR I.

1) c) Put in y the result of the encryption of s with the DES algorithm using the key K.

1) d) Put in $x_1$ the result of y XOR s.

1) e) Replace s with y XOR I.

1) f) Put in s the result of the encryption s with the DES algorithm using the key K.

2) Return as output the succession $(x_1, x_2 \ldots, x_m)$.

In this improved method for generating random numbers, DPA-type current-measuring attack is impossible because the input and output messages of the DES encryption algorithm are not known.

Both of the preceding methods of generating random numbers thus make it possible to obtain a random number generator that withstands DPA-type current-measuring attacks.

The invention claimed is:

1. A method for performing cryptographic operations using keys obtained from random numbers that are generated using the Data Encryption Standard (DES) algorithm with a secret key K, said method taking as input a random integer s of size 64 bits, and an integer m, said method sending back as output m 64-bit random integers $x_1, x_2, \ldots, x_m$, said method comprising the following steps:
 a) with the DES algorithm and using the key K, encrypting a value D representing date data and putting the result in an integer variable I;
 b) for j in the range 1 to m:
  b1) replacing s by s XOR I,
  b2) defining an integer variable y equal to the result of the encryption of s with the DES algorithm using the key K,
  b3) putting in $x_j$ the result of y XOR s,
  b4) replacing s with y XOR I,
  b5) putting in s the result of the encryption of s with the DES algorithm using the secret key K;
 c) returning as output the succession $(x_1, x_2, \ldots, x_m)$;
 d) obtaining keys corresponding to said values $x_1, x_2, \ldots x_m$; and
 e) performing cryptographic operations with said keys.

2. A method for performing cryptographic operations using keys obtained from random numbers, said method taking as input a random integer s of size 64 bits and an integer m, and sending back as output m 64-bit random integers $x_1, x_2, \ldots, x_m$, by using the Data Encryption Standard (DES) with a secret key K, an integer intermediate variable y, and a source S of random integers of 64 bits, said method comprising the following steps:
 a) for j in the range 1 to m:
  a1) generating an integer I by means of the source S,
  a2) replacing s with s XOR I,
  a3) putting in y the result of the encryption of s with the DES algorithm using the key K,
  a4) putting in $x_j$ the result of y XOR s,
  a5) replacing s with y XOR I
  a6) putting in s the result of the encryption of s with the DES algorithm using the key K;
 b) returning as output the succession $(x_1, x_2, \ldots, x_m)$;
 c) obtaining keys corresponding to said values $x_1, x_2, \ldots, x_m$; and
 d) performing cryptographic operations with said keys.

3. A handheld, wearable, or portable electronic device that executes the following steps to generate m 64-bit random integers $x_1, x_2, \ldots, x_m$:
 a) with the DES algorithm and using a key K, encrypt a value D representing date data and put the result in an integer variable I;
 b) for j in the range 1 to m:
  b1) replacing a random integer s by s XOR I,
  b2) putting in an integer variable y the result of the encryption of s with the DES algorithm using the key K,
  b3) putting in $x_j$ the result of y XOR s,
  b4) replacing s with y XOR I,
  b5) putting in s the result of the encryption of s with the DES algorithm using the secret key K;
 c) returning as output the succession $(x_1, x_2, \ldots, x_m)$;
 d) obtaining keys corresponding to said values $x_1, x_2, \ldots, x_m$; and
 e) performing cryptographic operations with said keys.

4. An electronic device according to claim 3, wherein said device is a smart card.

5. An electronic device according to claim 3, wherein said device is a contactless card.

6. An electronic device according to claim 3, wherein said device is a Personal Computer Memory Card International Association (PCMCIA) card.

7. An electronic device according to claim 3, wherein said device is a badge.

8. An electronic device according to claim 3, wherein said device is a smart watch.

9. A handheld, wearable, or portable electronic device that executes the following steps to generate m 64-bit random integers $x_1, x_2, \ldots, x_m$:
 a) for j in the range 1 to m:
  a1) generating a 64-bit random integer I,
  a2) replacing a 64-bit random integer s with s XOR I,
  a3) putting in an integer variable y the result of the encryption of s with the DES algorithm using the key K,
  a4) putting in $x_j$ the result of y XOR s,
  a5) replacing s with y XOR I,
  a6) putting in s the result of the encryption of s with the DES algorithm using the key K; and
 b) returning as output the succession $(x_1, x_2, \ldots, x_m)$;
 c) obtaining keys corresponding to said values $x_1, x_2, \ldots, x_m$; and
 d) performing cryptographic operations with said keys.

10. An electronic device according to claim 9, wherein said device is a smart card.

11. An electronic device according to claim 9, wherein said device is a contactless card.

12. An electronic device according to claim 9, wherein said device is a Personal Computer Memory Card International Association (PCMCIA) card.

13. An electronic device according to claim 9, wherein said device is a badge.

14. An electronic device according to claim 9, wherein said device is a smart watch.

* * * * *